(12) United States Patent
Hermann et al.

(10) Patent No.: US 10,996,233 B2
(45) Date of Patent: May 4, 2021

(54) LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventors: Pius Hermann, Stuttgart (DE); Jonathan Baer, Urswil (CH)

(73) Assignee: Roche Diagnostics Operations, Inc., Indianapolis, IN (US)

(*) Notice: Subject to any disclaimer, the term of this patent is extended or adjusted under 35 U.S.C. 154(b) by 311 days.

(21) Appl. No.: 16/195,216

(22) Filed: Nov. 19, 2018

(65) Prior Publication Data

US 2019/0086433 A1 Mar. 21, 2019

Related U.S. Application Data

(63) Continuation of application No. PCT/EP2017/063201, filed on May 31, 2017.

(30) Foreign Application Priority Data

Jun. 3, 2016 (EP) .................................. 16172825

(51) Int. Cl.
  *G01N 35/04* (2006.01)
  *B65G 43/00* (2006.01)
  *B65G 54/02* (2006.01)

(52) U.S. Cl.
  CPC ............ *G01N 35/04* (2013.01); *B65G 43/00* (2013.01); *B65G 54/02* (2013.01); *G01N 2035/0477* (2013.01)

(58) Field of Classification Search
  None
  See application file for complete search history.

(56) References Cited

U.S. PATENT DOCUMENTS

| | | |
|---|---|---|
| 3,273,727 A | 9/1966 | Rogers et al. |
| 3,653,485 A | 4/1972 | Donlon |
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |

(Continued)

FOREIGN PATENT DOCUMENTS

| | | |
|---|---|---|
| CN | 201045617 Y | 4/2008 |
| CN | 102109530 A | 6/2011 |

(Continued)

OTHER PUBLICATIONS

International Search Report dated Sep. 4, 2017, in Application No. PCT/EP2017/063201, 4 pages.

*Primary Examiner* — Kathryn Wright
(74) *Attorney, Agent, or Firm* — Roche Diagnostics Operations, Inc.

(57) ABSTRACT

A laboratory sample distribution system comprising a transport plane in which the transport plane is covered by an electrically conductive material is presented. A laboratory automation system comprising such a laboratory sample distribution system is also presented.

11 Claims, 1 Drawing Sheet

(56) References Cited

U.S. PATENT DOCUMENTS

| | | |
|---|---|---|
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mod et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,094,843 B2 | 10/2018 | Malinowski et al. |
| 10,119,982 B2 | 11/2018 | Baer |
| 10,288,634 B2 | 5/2019 | Kaeppeli |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1* | 7/2010 | King .................. H02K 41/031 104/281 |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0034410 A1* | 2/2013 | Heise ................. G01N 35/04 414/222.13 |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0202829 A1 | 7/2014 | Eberhardt et al. |
| 2014/0234949 A1 | 8/2014 | Wasson et al. |
| 2015/0014125 A1 | 1/2015 | Hecht |
| 2015/0101911 A1* | 4/2015 | Friedman ............ B65G 17/12 198/617 |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2015/0276782 A1 | 10/2015 | Riether |
| 2015/0337400 A1 | 11/2015 | Wilson et al. |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0229565 A1 | 8/2016 | Margner |
| 2016/0297626 A1* | 10/2016 | Jochim ................ G05B 19/042 |
| 2016/0341750 A1 | 11/2016 | Sinz et al. |
| 2016/0341751 A1 | 11/2016 | Huber et al. |
| 2017/0059599 A1 | 3/2017 | Riether |
| 2017/0097372 A1 | 4/2017 | Heise et al. |
| 2017/0101277 A1 | 4/2017 | Malinowski |
| 2017/0108522 A1 | 4/2017 | Baer |
| 2017/0131307 A1 | 5/2017 | Pedain |
| 2017/0131310 A1 | 5/2017 | Volz et al. |
| 2017/0138971 A1 | 5/2017 | Heise et al. |
| 2017/0168079 A1 | 6/2017 | Sinz |

(56) References Cited

U.S. PATENT DOCUMENTS

| | | |
|---|---|---|
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0074087 A1 | 3/2018 | Heise et al. |
| 2018/0106821 A1 | 4/2018 | Vollenweider et al. |
| 2018/0128848 A1 | 5/2018 | Schneider et al. |
| 2018/0156835 A1 | 6/2018 | Hassan |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1 | 8/2018 | Malinowski |
| 2018/0217176 A1 | 8/2018 | Sinz et al. |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |
| 2020/0200783 A1 | 6/2020 | Durco |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1997 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| EP | 3073270 A1 | 9/2016 |
| EP | 3121603 A1 | 1/2017 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-113853 A | 5/1988 |
| JP | S63-290101 A | 11/1988 |
| JP | S64-023907 A | 1/1989 |
| JP | 1148966 A | 6/1989 |
| JP | H01-266860 A | 10/1989 |
| JP | H02-87903 A | 3/1990 |
| JP | H02-175802 A | 7/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2006-221024 A | 8/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2011-121688 A | 6/2011 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/064656 A1 | 5/2013 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

\* cited by examiner

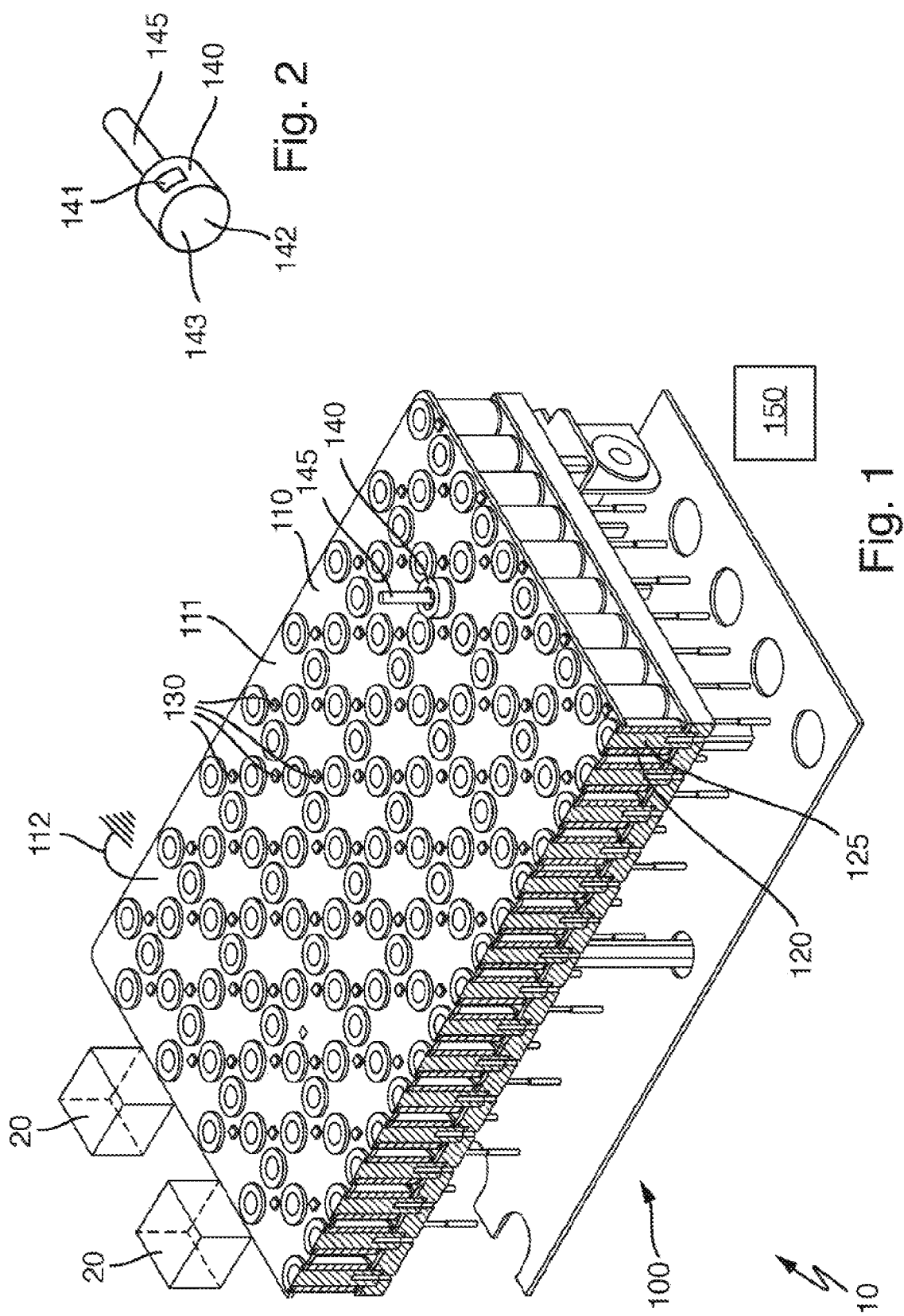

LABORATORY SAMPLE DISTRIBUTION SYSTEM AND LABORATORY AUTOMATION SYSTEM

CROSS-REFERENCE TO RELATED APPLICATIONS

This application is a continuation of PCT/EP2017/063201, filed May 31, 2017, which is based on and claims priority to EP 16172825.8, filed Jun. 3, 2016, which is hereby incorporated by reference.

BACKGROUND

The present disclosure generally relates to a laboratory sample distribution system comprising a transport plane, a number of sample container carriers, a driver configured to move the sample container carriers on the transport plane, and a control device configured to control the movement of the sample container carriers on top of the transport plane by driving the driver such that the sample container carriers move along corresponding transport paths. The present disclosure also relates to a laboratory automation system comprising a number of laboratory stations and a laboratory sample distribution system.

Known laboratory sample distribution systems are typically used in laboratory automation systems in order to transport samples contained in sample containers between different laboratory stations.

However, there is a need for to optimize a laboratory sample distribution system and a laboratory automation system comprising a laboratory sample distribution system.

SUMMARY

According to the present disclosure, a laboratory sample distribution system is presented. The laboratory sample distribution system can comprise a transport plane. The transport plane can be covered by a first electrically conductive material. The laboratory sample distribution system can also comprise a number of sample container carriers, a driver configured to move the sample container carriers on the transport plane, and a control device configured to control the movement of the sample container carriers on top of the transport plane by driving the driver such that the sample container carriers move along corresponding transport paths.

Accordingly, it is a feature of the embodiments of the present disclosure to to further optimize a laboratory sample distribution system and a laboratory automation system comprising a laboratory sample distribution system. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 1 illustrates a laboratory automation system comprising a laboratory sample distribution system according to an embodiment of the present disclosure.

FIG. 2 illustrates a sample container carrier in a perspective bottom side view according to an embodiment of the present disclosure.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The laboratory sample distribution system can comprise a transport plane. The laboratory sample distribution system can further comprise a number of sample container carriers and a driver configured to move the sample container carriers on (over) the transport plane. The laboratory sample distribution system can further comprise a control device, e.g., in the form of a microprocessor or a personal computer, configured to control the movement of the sample container carriers on top of the transport plane by driving the driver such that the sample container carriers move along corresponding transport paths. The transport plane can be covered by (coated with) or can be made of a (first) electrically conductive material.

By use of the electrically conductive material covering the transport plane, electric charges arising during movement of the sample container carriers can be distributed over the transport plane and can, if appropriate grounding is present, be conducted to ground in order to eliminate the electric charges from the transport plane. This can reduce electric charges on the transport plane that can disturb operation of the laboratory sample distribution system.

According to an embodiment, the first electrically conductive material can be or can comprise a copolyester material.

According to an embodiment, the first electrically conductive material can be or can comprise a polyethylene terephthalate material.

According to an embodiment, the first electrically conductive material can be an optically bright material. This has been proven suitable for optically surveilling operation of the laboratory sample distribution system.

According to an embodiment, the first electrically conductive material can lack a carbon-based electrically conducting additive. In other words, the first electrically conductive material can be free of a carbon-based electrically conducting additive. This has been proven suitable in order to get an optically bright material being electrically conducting.

According to an embodiment, the transport plane can have a grained surface. This can further reduce friction between the transport plane and the sample container carriers.

According to an embodiment, each sample container carrier can comprise a flat bottom surface for moving on the transport plane. The bottom surface can be covered by or can be made of a (second) electrically conductive material. This can allow for an easy transport of electric charges present on the bottom surface of the transport plane, where the electric charges can be distributed or discharged.

According to an embodiment, the second electrically conductive material can be or can comprise an ultra-high molecular polyethylene.

According to an embodiment, the first electrically conductive material and/or the second electrically conductive material can be or can comprise an electrically conductive polymer.

According to an embodiment, the first electrically conductive material and/or the second electrically conductive material can comprise an electrically conducting additive. The electrically conducting additive can be used to achieve an electrically conductive material without using dark carbon-based materials.

According to an embodiment, the electrically conducting additive can be a polyaniline material or another electrically conductive polymer.

According to an embodiment, the first electrically conductive material and/or the second electrically conductive material can be low friction and/or low wear materials. This can further reduce friction or wear between the transport plane and the sample container carriers when the sample container carriers move on the transport plane.

According to an embodiment, the first electrically conductive material and/or the second electrically conductive material can be configured to at least approximately equate gliding friction and static friction. This has been proven suitable for longtime reliable operation. Especially, spilling can be prevented by this measure. The first electrically conductive material and/or the second electrically conductive material can be configured to exactly equate gliding friction and static friction.

According to an embodiment, the driver can be formed as electromagnetic actuators located as a grid having rows and columns below the transport plane and controllable by the control device. The sample container carriers can each comprise a magnetically active device, e.g., in the form of a permanent magnet, for interaction with a magnetic field generated by the electromagnetic actuators such that a magnetic drive force can be applied to the sample container carriers. Such an embodiment can allow for reliable operation using magnetic drive forces in order to drive the sample container carriers on the transport plane.

A laboratory automation system comprising a number of laboratory stations such as, for example, pre-analytical, analytical and/or post-analytical stations, and an above laboratory sample distribution system is also presented. With regard to the laboratory sample distribution system, all embodiments and variations discussed herein can be applied.

The stations may be arranged adjacent to the laboratory sample distribution system.

Pre-analytical stations may be configured to perform any kind of pre-processing of samples, sample containers and/or sample container carriers.

Analytical stations may be configured to use a sample, or part of the sample, and a reagent to generate a measuring signal. The measuring signal can indicate if and in what concentration, if any, an analyte exists.

Post-analytical stations may be configured to perform any kind of post-processing of samples, sample containers and/or sample container carriers.

The pre-analytical, analytical and/or post-analytical stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, and a sealing/desealing station.

It can be noted that for the first electrically conductive material, a material called PET Eastar 6763 (including 12 percent by weight PETG Funaden perm AS (14-05189))/ Funaden el. Cond. (eroding structure K29 VDI 3400), Ra 2.8, has been proven as a suitable material. For the second electrically conductive material, the material PE-UHMW-S-Bright-ESD of Murtfeldt, Ra 3.2, has been proven suitable. The Ra-terms determine the roughness of the respective material.

Referring initially to FIG. 1, FIG. 1 shows a laboratory automation system 10 comprising a laboratory sample distribution system 100 and a number of pre-analytical, analytical and/or post-analytical stations 20 arranged adjacent to the laboratory sample distribution system 100. Self-evidently, more than the two stations 20 depicted in FIG. 1 may be comprised in the laboratory automation system 10.

The laboratory sample distribution system 100 can comprise a transport plane 110 below which a plurality of electromagnetic actuators in the form of electromagnets 120 can be positioned in rows and columns. The electromagnets 120 can be implemented as solenoids having solid ferromagnetic cores 125.

Sample container carriers 140 can be positioned on the transport plane 110 and can be moved by the electromagnets 120, because each sample container carrier 140 can comprise a magnetically active device 141 in the form of a permanent magnet.

While it can be understood that a plurality of sample container carriers 140 can be positioned on the transport plane 110, due to simplicity only a single sample container carrier 140 is depicted in FIG. 1. The sample container carrier 140 can hold and carry a sample container 145, in which a sample to be analyzed can be contained.

The laboratory sample distribution system 100 can be configured to transport the sample container carriers 140 and/or the sample containers 145 between the laboratory stations 20. The laboratory stations 20 can be positioned adjacent to the transport plane 110 such that a sample container carrier 140 can be used to transport a sample contained in the sample container 145 to a respective laboratory station 20.

A plurality of Hall-sensors 130 can be arranged such that positions of respective sample container carriers 140 on the transport plane 110 can be detected.

The laboratory sample distribution system 100 can further comprise a control device 150. The control device 150 can be configured to control movement of the sample container carriers 140 on the transport plane by driving the electromagnets 120 such that the sample container carriers 140 independently and simultaneously move along corresponding transport paths.

The transport plane 110 can be covered or coated with a first electrically conductive material 111.

In the present case, the first electrically conductive material 111 can comprise a copolyester material and a polyethylene terephthalate material. The first electrically conductive material 111 can be optically bright and can comprise an electrically conductive additive being a polymer such that no carbon-based electrically conductive additives have to be used. Furthermore, the first electrically conductive material 111 can be connected to a grounding 112 such that electric charges can be discharged to ground.

FIG. 2 shows the sample container carrier 140 with its sample container 145 in a perspective view, such that a bottom surface 142 of the sample container carrier 140 is visible.

The bottom surface 142 can be covered or coated by a second electrically conductive material 143, which can be comprised of an ultra-high molecular polyethylene comprising an electrically conductive polymer.

The sample container carriers 140 can each comprise a magnetically active device 141 in the form of a permanent magnet for interaction with a magnetic field generated by the electromagnetic actuators 120 such that a magnetic drive force can be applied to the sample container carriers 140.

The electric charges, generated when operating the sample distribution system 100 by moving the sample container carriers 140 over the transport plane 110, can be safely discharged, thus avoiding malfunctions.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory sample distribution system, the laboratory sample distribution system comprising:
    a transport plane, wherein the transport plane is covered by a first electrically conductive material, the first electrically conductive material includes a copolyester material or polyethylene terephthalate material;
    a number of sample container carriers, and each of the number of sample container carrier comprises a flat bottom surface for moving on the transport plane, the bottom surface being covered with a second electrically conductive material;
    a driver configured to move the sample container carriers on the transport plane, wherein the driver; and
    a control device configured to control the movement of the sample container carriers on top of the transport plane by driving the driver such that the sample container carriers move along corresponding transport paths,
    wherein the driver is configured as electromagnetic actuators located below the transport plane and is controllable by the control device; and
    wherein each of the number of the sample container carriers each further comprise a magnetically active device for interaction with a magnetic field generated by the electromagnetic actuators such that a magnetic drive force is applied to each of the number of the sample container carriers.

2. The laboratory sample distribution system according to claim 1, wherein the first electrically conductive material is an optically bright material.

3. The laboratory sample distribution system according to claim 1, wherein the first electrically conductive material lacks a carbon-based electrically conducting additive.

4. The laboratory sample distribution system according to claim 1, wherein the transport plane has a grained surface.

5. The laboratory sample distribution system according to claim 1, wherein the second electrically conductive material comprises an ultrahigh molecular polyethylene.

6. The laboratory sample distribution system according to claim 1, wherein the first electrically conductive material and/or the second electrically conductive material is an electrically conductive polymer.

7. The laboratory sample distribution system according to claim 1, wherein the first electrically conductive material and/or the second electrically conductive material comprises an electrically conducting additive.

8. The laboratory sample distribution system according to claim 7, wherein the electrically conducting additive is an electrically conducting polymer.

9. The laboratory sample distribution system according to claim 1, wherein the first electrically conductive material and/or the second electrically conductive material is a low friction and/or low wear material.

10. The laboratory sample distribution system according to claim 1, wherein the first electrically conductive material and/or the second electrically conductive material is configured to at least approximately equate gliding friction and static friction.

11. A laboratory automation system, the laboratory automation system comprising: a number of laboratory stations; and a laboratory sample distribution system according to claim 1.

* * * * *